July 17, 1923.
S. Z. BLAND
1,461,964
TIMING DEVICE FOR CREAM TESTERS
Filed Oct. 5, 1922
2 Sheets-Sheet 1
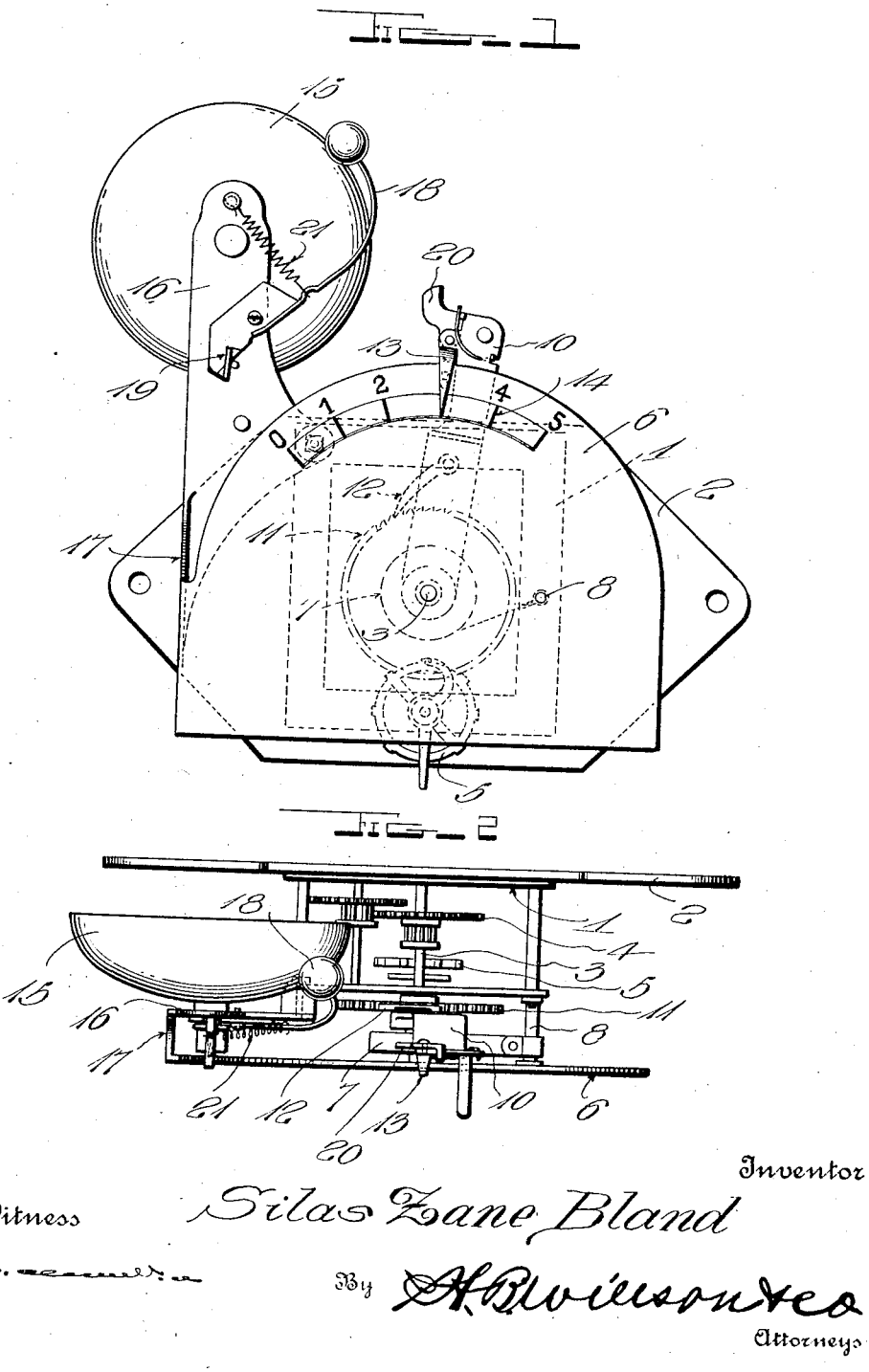
Witness
Inventor
Silas Zane Bland
By H. B. Willson & Co.
Attorneys

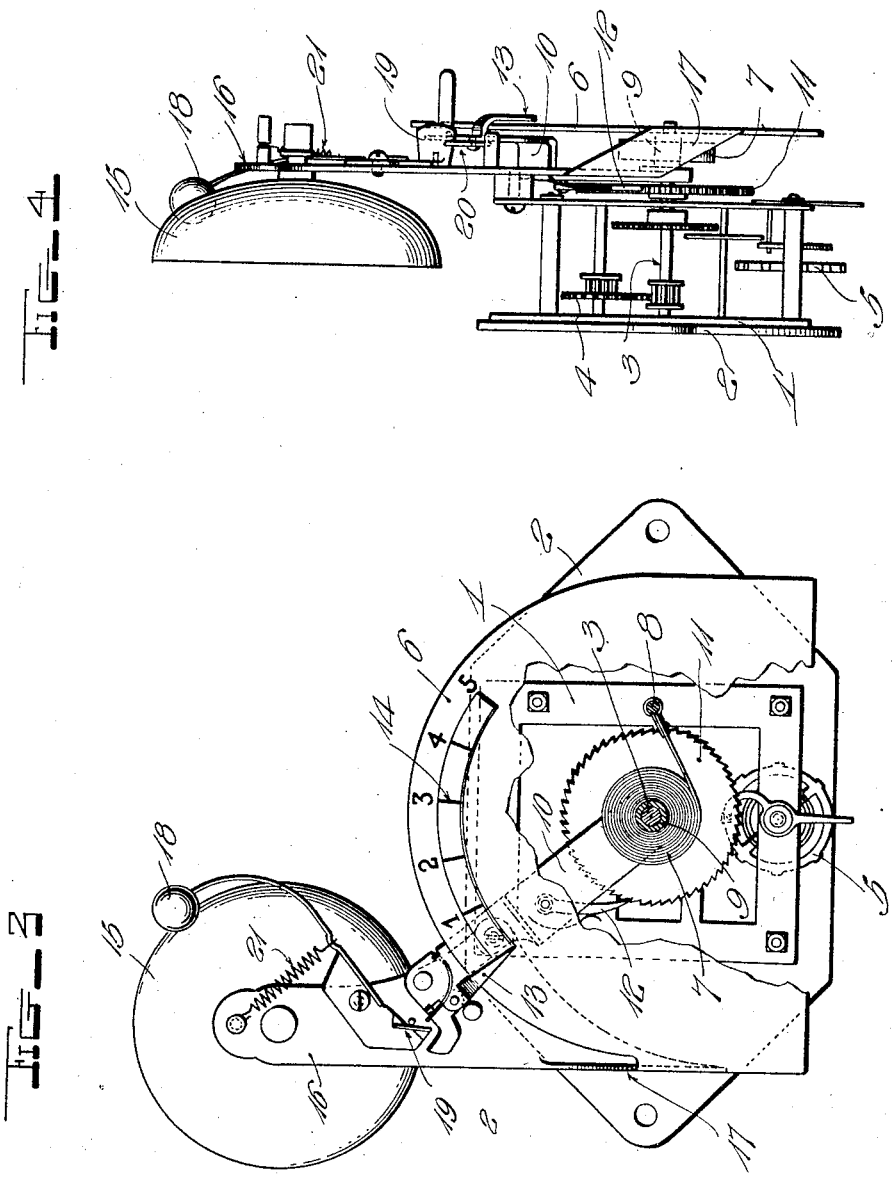

Patented July 17, 1923.

1,461,964

UNITED STATES PATENT OFFICE.

SILAS ZANE BLAND, OF NEOGA, ILLINOIS.

TIMING DEVICE FOR CREAM TESTERS.

Application filed October 5, 1922. Serial No. 592,546.

*To all whom it may concern:*

Be it known that I, SILAS ZANE BLAND, a citizen of the United States, residing at Neoga, in the county of Cumberland and State of Illinois, have invented certain new and useful Improvements in Timing Devices for Cream Testers; and I do declare the following to be a full, clear, and exact description of the invention, such as will enable others skilled in the art to which it appertains to make and use the same.

My invention relates to improvements in timing devices and more particularly to one adapted for use in connection with cream testers which carry out the well known Babcock test for ascertaining the percentage of butter fat contained in cream or whole milk. In carrying out the test, the operator accurately weighs out nine grams of cream, adds sufficient sulphuric acid to turn the mixture to a chocolate brown, adds a little water and then places the mixture in the testing machine and revolves at a high rate of speed for five minutes. He then must take the mixture out of the machine and add enough water to almost fill the neck of the testing bottle, after which it is again returned to the machine and the latter is run for three minutes more. In carrying out this testing method, it is now necessary to frequently consult a watch or clock which means a great deal of anxiety for the operator, lest he run the test either too short or too long a time, it being understood that his time is consumed with other duties and that he cannot continually stand idle and watch the clock while carrying out the test.

It is the object of my invention to provide a simple and inexpensive timing device which may be set when the testing operation is started and which will operate an alarm when the testing machine has been running five minutes. Then, when the second step of the testing operation is started, the timing device is reset and will give a second alarm at the end of the three minutes, whereupon the operator should discontinue the test.

In carrying out the above end, I make use of a spring-actuated alarm-operating member and means such as a chronometric mechanism for controlling the speed of said member, a further object being to provide an arrangement of such nature that the operating spring of the alarm-actuated member is automatically rewound to the necessary extent, simply by setting the device for use.

Another object is to provide for driving the speed controlling means of the alarm actuating member, from this member, so that when the latter comes to a standstill, the controlling means will also come to rest, saving useless wear and expending of spring energy which might otherwise take place.

With the foregoing in view, the invention resides in the novel subject matter hereinafter described and claimed, the description being supplemented by the accompanying drawing.

Fig. 1 is a front elevation of a timing device constructed in accordance with my invention, showing the same set.

Fig. 2 is an upper end view.

Fig. 3 is a front elevation partly broken away and in section, showing the device in its idle position.

Fig. 4 is an edge view.

In the drawing above briefly described, the numeral 1 designates a suitable frame preferably provided with a back plate 2 to be secured against a wall adjacent the testing machine or to any other suitable support. The frame 1 is provided with suitable bearings carrying a shaft 3 with which a train of gearing 4 is operatively associated, said gearing including a balance wheel 5.

Spaced in front of the frame 1 is a dial plate 6 to which the shaft 3 extends, a spiral spring 7 being located at the inner side of the plate 6 around the shaft 3, although said spring is free of direct connection with this shaft. One end of the spring 7 is connected to a suitable anchoring post or the like 8 while the other end of said spring is suitably connected with a sleeve 9 which is free to rotate on the shaft 3 between the dial plate 6 and the frame 1. An alarm operating arm 10 has its inner end secured to the sleeve 9, whereby when this arm is moved in one direction, it will increase the tension of the spring 7 so that this tension will tend to return the arm to its initial position. I make use of the gearing 4 and balance wheel 5 however in controlling the speed at which the arm 4 returns to said initial position, by providing the shaft 3 with a ratchet wheel 11 and providing the arm 10 with a dog 12 engaging said ratchet wheel. When the arm 10 is moved to any set position, the dog 12 clicks idly over the teeth of the ratchet wheel 11 but when said arm is released and the spring 7 starts movement of said arm toward its initial or operative position, the dog 12 drives the ratchet wheel 11 and the latter in turn brings the entire train of gearing 4 and the balance wheel 5 into play. Thus, the speed at which the arm 10 returns is under accurate control. It will of course be understood that the time consumed for the arm 10 to return to its operative position will depend entirely upon the distance which said arm is moved from this position. In adapting the invention to the use above outlined, I provide the arm 10 with a pointer 13 co-operable with a minute scale 14 on the dial plate 6, this scale being separated into five minutes in the present instance. If arm 10 is set so that its pointer 13 is at the five minute mark on the scale 14, it will take said arm five minutes to return to its initial position at which point it will operate an alarm. Similarly, if the pointer 13 is set at 3 on the scale 14, it will require three minutes for the arm to return to alarm operating position.

In the present embodiment of my invention, the alarm is shown in the form of a gong 15 mounted on a standard 16 which rises rigidly from the frame 1 and dial plate 6, said standard being spaced slightly behind said dial plate. Preferably, the standard 16 is integrally joined to the dial plate 6 by a laterally extending vertical flange 17 and said standard is secured by a screw or other preferred means to the frame 1. Suitably pivoted upon the standard 16 is a gong actuating clapper 18 having a cam 19 on its pivoted end which is oblique to the arc on which the outer end of the arm 10 swings. This end of the arm 10 is provided with a pivoted spring-pressed dog 20 which, when the arm is moved under the influence of the spring 7, is adapted to strike the cam 19 and retract the clapper 18 against the tension of its operating spring 21. Thus, when dog 20 leaves the cam 19, the spring 21 actuates the clapper to sound the gong 15, giving notice that the time for which the device was set has been consumed. When the arm 10 is moved along the scale 14 to any desired set position, the dog 20 merely clicks idly under the cam 19.

Excellent results have been obtained from the details disclosed and they are therefore preferably followed, but it is to be understood that within the scope of the invention as claimed, numerous minor changes may be made. Furthermore, while I have herein described one use of my invention which calls preferably for a five minute scale 14 on the dial plate, it will be understood that this plate or its equivalent may be divided into any desired number of time units and that the device may be used wherever desirable.

I claim:

1. In a structure of the character described, a frame including spaced plates and a train of gearing, including a ratchet wheel, a signal including a striker movably mounted, a rotatably mounted sleeve extending axially of said ratchet wheel, a spring coiled about said sleeve and having one end connected therewith and its other end connected with a portion of said frame, a dial, an arm carried by said sleeve and extending in operative relation to said dial and movable into and out of position for operative engagement with said striker, and a pawl carried by said arm and engaging said ratchet wheel, the pawl moving freely over the ratchet wheel when the arm is swung to a set position and the pawl engages the ratchet wheel to permit control of the swinging of said arm by said gearing when the arm is moved toward operative engagement with said striker by said spring.

2. A structure of the character described comprising a frame having a train of gearing mounted therein, a signal including an operated element, said gearing including a ratchet wheel and escapement mechanism controlling speed of rotation of said gearing when said ratchet wheel is turned in one direction, a sleeve rotatably mounted axially of said ratchet wheel, a coiled spring positioned about and having one end connected with said sleeve, an arm extending from said sleeve, a dial formed upon the arc of a circle, a pointer extending from said arm in operative relation to said dial, means carried by said arm for actuating the operating element of said signal, and a pawl carried by said arm and having engagement with said ratchet wheel to impart rotation to the same when said arm has been swung to a set position and is moving to an operative position under the influence of said spring.

In testimony whereof I have hereunto affixed my signature.

SILAS ZANE BLAND.